United States Patent
Biskeborn et al.

(10) Patent No.: US 7,551,385 B2
(45) Date of Patent: Jun. 23, 2009

(54) SYSTEMS AND METHOD FOR SELECTIVELY CONTROLLING A STATE OF HYDRATION OF A MAGNETIC DATA STORAGE MEDIUM

(75) Inventors: Robert Glenn Biskeborn, Hollister, CA (US); Calvin Shyhjong Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/746,011

(22) Filed: May 8, 2007

(65) Prior Publication Data

US 2008/0278851 A1  Nov. 13, 2008

(51) Int. Cl.
  *G11B 15/18*  (2006.01)
  *G11B 5/10*   (2006.01)
  *G11B 5/76*   (2006.01)
(52) U.S. Cl. .................. 360/69; 360/128; 360/137
(58) Field of Classification Search .......... None
  See application file for complete search history.

(56) References Cited

U.S. PATENT DOCUMENTS

| | | | | |
|---|---|---|---|---|
| 3,064,259 A | * | 11/1962 | Schwertz | 347/146 |
| 3,308,473 A | * | 3/1967 | Sawazaki | 347/154 |
| 4,167,725 A | * | 9/1979 | Shimizu et al. | 338/35 |
| 4,410,896 A | * | 10/1983 | Nelson et al. | 346/74.2 |
| 4,467,382 A | | 8/1984 | Huisman | 360/125 |
| 5,327,315 A | | 7/1994 | Nouchi et al. | 360/137 |
| 5,729,398 A | * | 3/1998 | Nouchi et al. | 360/69 |
| 6,005,736 A | * | 12/1999 | Schreck | 360/75 |
| 6,359,746 B1 | * | 3/2002 | Kakekado et al. | 360/75 |
| 7,310,198 B2 | * | 12/2007 | Baumgart et al. | 360/75 |

FOREIGN PATENT DOCUMENTS

| | | |
|---|---|---|
| JP | 04-298841 | 10/1992 |
| JP | 09082014 A * | 3/1997 |

\* cited by examiner

*Primary Examiner*—K. Wong
(74) *Attorney, Agent, or Firm*—Zilka-Kotab, PC

(57) ABSTRACT

A magnetic storage system according to one embodiment includes a magnetic head adapted for at least one of reading from a magnetic medium and writing to the medium; a drive mechanism for directing the medium over the head; and a first element for selectively altering a voltage of the medium for altering a state of hydration of the medium.

20 Claims, 1 Drawing Sheet

SYSTEMS AND METHOD FOR SELECTIVELY CONTROLLING A STATE OF HYDRATION OF A MAGNETIC DATA STORAGE MEDIUM

FIELD OF THE INVENTION

The present invention relates to data storage systems, and more particularly, this invention relates to a system for selectively altering the hydration of a magnetic data storage medium.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

A magnetic tape is typically a multilayer structure including a base layer and a magnetically definable layer in which data is stored. The magnetically definable layer may include pure metal particles that define the magnetic transitions that represent data. In other magnetic tapes, the magnetic layers may be either sputtered or evaporated magnetic films. In addition, the tapes may contain binders, lubricants and other materials.

One problem frequently encountered during reading and writing to tape is that magnetic materials or fragments therefrom can come loose from the tape and adhere to the head, sometimes leading to the formation of metallic bridges on the head. Another problem is formation of metallic bridges via electrostatic or electrochemical interaction between head and tape. Read sensors are particularly susceptible to failure due to shield-shorting as a result of bridging. Conductive accumulation have been found to be more prevalent in low humidify conditions, e.g., less than about 20% relative humidity. Such low humidity conditions are typical with the current prevalence of air conditioned server rooms and business places.

Accordingly, having some amount of hydration in the tape pack is desirable for promoting oxidation of metallic accumulations on the head.

However, at the other extreme, operating in a high humidity environment, e.g., typically greater than about 55% relative humidity, is problematic in that the tape may become too hydrated. This water in turn is implicated in corrosion of corrodible materials in the head, such as the iron in the writer pole tips. In addition, aluminum oxide, which is a typical component in modern heads, is amphitheric and susceptible to chemical attack when subjected to a hydrated environment. It is found that excessive tape hydration accelerates head erosion. Further, excessive hydration is widely believed to increase stiction between the tape and the head.

The only known solutions to these problems are to bury the reader and writer structures to prevent contact with the water or the conductive accumulation, and/or to coat the head with a durable wear coating. In the former case, such a recessed sensor has not been implemented and is believed to be difficult to manufacture, and would also result in an undesirable spacing loss. The latter method is complex and expensive and the coatings may wear off over time, even with pre-recession.

SUMMARY OF THE INVENTION

A magnetic storage system according to one embodiment includes a magnetic head adapted for at least one of reading from a magnetic medium and writing to the medium; a drive mechanism for directing the medium over the head; and a first element for selectively altering a voltage of the medium for altering a state of hydration of the medium.

A magnetic storage system according to another embodiment, includes a magnetic head adapted for at least one of reading from a magnetic medium and writing to the medium; a drive mechanism for directing the medium over the head; and a first element for selectively altering a voltage of the medium for altering a state of hydration of the medium, wherein the first element contacts portions of the medium prior to the portions of the medium passing over the head; wherein the voltage applied to the medium using the first element is based at least in part on the voltage of the medium; wherein the voltage applied to the medium using the first element is further based at least in part on an ambient humidity level.

A tape drive system according to yet another embodiment includes a magnetic head; a drive mechanism for passing a magnetic tape over the head; a controller in communication with the head; and a first element for applying a voltage to the tape for altering a state of hydration of the tape.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should he made to the following detailed description read in conjunction with the accompanying drawings.

BEST MODE FOR CARRYING OUT THE INVENTION

Figure 1:
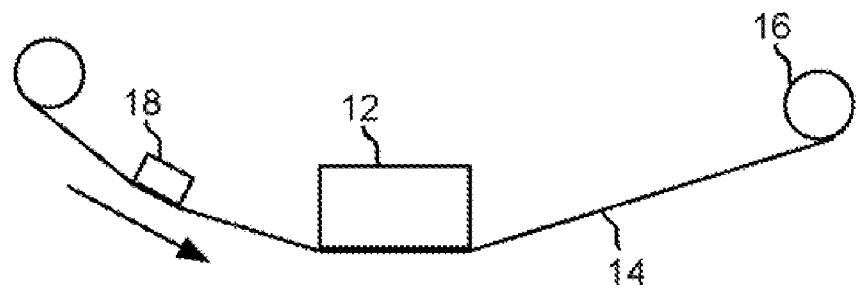
FIG. 1 is a diagram of magnetic storage system according to an embodiment of the present invention.

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

When using a magnetic storage system, humidity in the air promotes tape hydration. Excessive hydration of the medium is believed to be implicated in oxidation of corrodible materials in the head, such as iron in the pole tips.

The embodiments described below disclose a new system that provides a measure of control over the state of hydration of a magnetic medium such as a magnetic recording tape.

Some embodiments do this by altering the medium voltage level sufficiently to create electric fields that are large enough to drive at least some of the water off the medium surface, as by electrolysis (and possibly other mechanisms). Other embodiments do this by altering the voltage level of the medium to moderate and/or counter dehydration effects cause by voltages applied to the medium by the head, particularly at low humidity levels. Accordingly, various embodiments may alter the voltage on the medium to drive at least some water off of the medium, alter the voltage on the medium to maintain a state of hydration of the medium and/or apply no voltage if situationally appropriate.

In one general embodiment of the present invention, shown in FIG. 1, a magnetic storage system 10 includes a magnetic head 12 adapted for at least one of reading from a magnetic medium 14 and writing to the medium 14, a drive mechanism 16 for directing the medium 14 over the head 12 and a first element 18 for altering a voltage of the medium 14 for altering a state of hydration of the medium 14.

To aid the reader in understanding the teachings herein, and to place the invention in a context, much of the present description is presented in terms of implementation in a tape-based data storage system. It should be kept in mind that the general concepts presented herein have broad applicability to electronic devices of other types.

Figure 2:
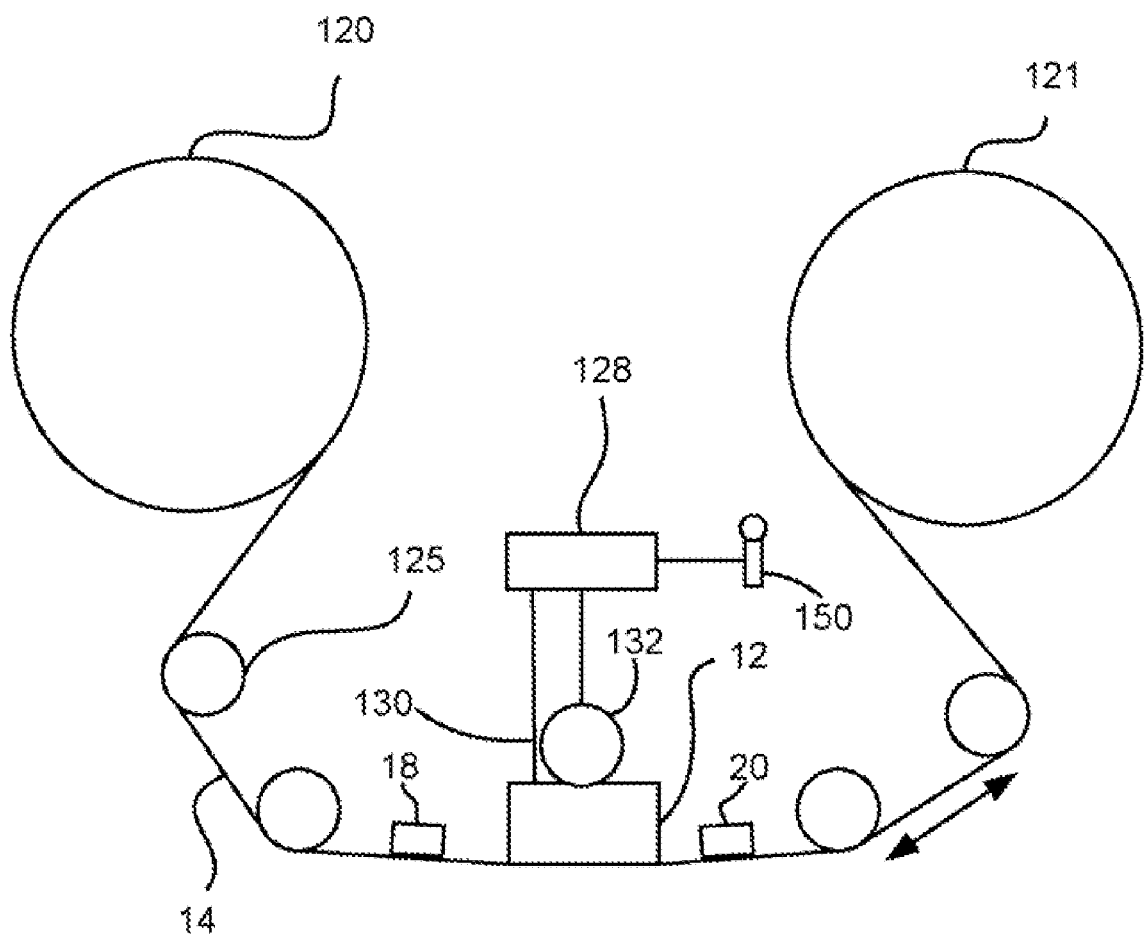
FIG. 2 is a diagram of magnetic storage system according to another embodiment of the present invention.

FIG. 2 illustrates a simplified tape drive system which may be employed in the context of the present invention. While one specific implementation of a tape drive system is shown in FIG. 2, it should be noted that the various embodiments described herein may be implemented in the context of any type of tape drive system.

As shown, a tape supply reel 120 and a take-up reel 121 are provided to support a magnetic recording tape 14. The tape supply reel 120 and take-up reel 121 may form part of a removable cassette and are not necessarily part of the system. Guides 125 of the drive mechanism guide the tape 14 across a tape head 12 of any type, including a bidirectional head, flat profile head, semi-cylindrical profile head, etc. Such tape head 12 is in turn coupled to a controller 128 via a connector cable 130. The controller 128, in turn, controls head functions such as track following, writing and read functions, etc. An actuator 132 controls position of the head 12 relative to the tape 14.

A tape drive system, such as that illustrated in FIG. 2, includes drive motor(s) to drive the tape supply cartridge 120 and the take-up reel 121 to move the tape 14 linearly over the head 12. The tape drive also includes a read/write channel to transmit data to the head 12 to be recorded on the tape 14 and to receive data read by the head 12 from the tape 14. An interlace is also provided for communication between the tape drive and a host (integral or external) to send and receive the data and for controlling the operation of the tape drive and communicating the status of the tape drive to the host.

When using a tape drive system such as that shown in FIG. 2, humidity in the air promotes hydration of the tape. As mentioned above, excessive hydration of the tape is believed to be implicated in oxidation of corrodible materials in the head, such as the iron in the pole tips.

However, some level of hydration of the magnetic medium may be desirable in that this is believed to promote the oxidation of metallic accumulations and/or formations on the head. Oxidized iron, for example, may be non-electrically conductive and so does not have the potential to cause surface shorting on the heads. In embodiments where iron-containing tape is used, tape hydration promotes the corrosion (oxidation) of parasitic iron films on the head. Corrosion of iron is also known as "rusting." The parasitic iron may come from fragments of the magnetic definable layer of the medium. Another cause of shorting on the head can be growth of metallic bridges which is assisted in part by electric fields within the head and between the head and tape. By promoting oxidation of the iron film, water in the tape can minimize and often eliminate shorting.

At high enough hydration levels, water adsorbed to the tape may form a locally continuous monolayer or thin film. This film in turn may capture $O_2$, $CO_2$ and other gases from the atmosphere. Generally, captured gaseous molecules may be or become ionized. When this film comes in contact with a corrodible metal, such as that found in accumulations on the head, corrosion may occur. The pathway for this reaction may be as follows. Partially ionized carbon dioxide in the adsorbed water may form a weak carbonic acid. The acid dissolves the iron and some water breaks down into hydrogen and oxygen. Free oxygen and dissolved iron react to form iron oxide, in the process freeing electrons. Electrons liberated from the anode portion of the iron (accumulated particles) flow to the cathode, which may be a piece of a metal less electrically reactive than iron, e.g., other portions of the head, another point on the iron deposit, etc. The result is that iron is converted into rust. This is beneficial for disrupting unwanted iron accumulations on the head.

The greater the hydration of the tape, the greater the corrosion reaction rate. However, excessive hydration should be avoided so as to minimize corrosion of the pole tips and other corrodible portions of the head. Pole tip corrosion leads to spacing loss and broader written transitions than written by the head at initial use. The amount of tape hydration is proportional to the ambient humidity level. Relative humidity is the ratio of the amount of water vapor in the air at a given temperature to the maximum amount air can hold at the same temperature, expressed as a percentage. At very low humidity, e.g., less than about 20% relative humidity, conductive bridges on the surface of the head may form. This is believed to be due to insufficient tape hydration such that there is not enough water in the system to promote an oxidation reaction. Without wishing to be bound by any theory, it is believed that when the tape hydration level is low, there are not enough adsorbed or absorbed ions and so corrosion of the metallic formations on the head is very limited.

Accordingly, with continued reference to FIG. 2, the system includes a first element 18 for altering a voltage of the tape 14 for altering a state of hydration of the tape 14. The first element 18 may contact portions of the tape 14 prior to those portions passing over the head 12. In other words, the first element is preferably positioned in front of the head relative to the direction of tape travel. The first element 18 is also preferably positioned close to the head for ensuring that the tape hydration level does not have time to revert to its equilibrium level. The tape may wrap the first element 18 to promote contact therebetween (see FIG. 1). Illustrative wrap angles are less than about 1°, but could be higher or lower.

With continued reference to FIG. 2, the extent to which the first element alters the tape charge state may be based at least in part on an ambient humidity. Humidity may be measured in the drive, outside the drive, or both. The first element 18 induces a voltage on the tape 14 at a first level if the ambient humidity is above a first threshold amount, whereas the first element 18 induces a voltage on the tape 14 at a lower level than the first level if the ambient humidity is below the first threshold amount.

For example at high humidity, at or higher than a threshold level, e.g., approximately 50-60% relative humidity, a relatively large tape voltage (e.g., about 1.5 to about 10V or more) may be required for dehydrating the tape to an acceptable level. At high humidity, tape voltage should be adjusted to a value that is typically higher (or lower) than the head voltages by typically several volts. Higher voltages are preferable as humidity increases, according to a linear or nonlinear scale, table of voltage to humidity, etc. The head voltages may refer to the substrate voltage (assuming the substrate is conductive) and/or MR shield and writer pole voltages. These voltages are typically set in the drive. An illustrative median substrate voltage is between about 0V and about 2V.

At low humidity, at or below a threshold level, such as below 20-35% relative humidity, the system may adjust tape voltage to about match voltages in the head, e.g. substrate voltage (assuming the substrate is conductive) and/or MR shield and writer pole voltages. By matching tape and head voltages as closely as possible, tape surface hydration is maximized (dehydration is minimized), thus promoting oxidizing iron and other conductive formations on the head surface, such as magnetic material from the tape that gets deposited on the head during drive operation or bridges that grow under the action of electric fields and electrochemical processes.

In another approach, the tape voltage is not altered at low humidity.

In yet another approach, an oscillating or DC voltage may be applied to the tape via an electrical contact.

For humidity between the high and low threshold values, e.g., in the range of 25-55% relative humidity., the voltage on the tape may be adjusted to about match the native sense voltage, such as the median voltage of a sensor or sensors of the head.

Any type of humidity measuring device or sensor 150 known in the art may be used. For example, a digital humidity sensor for sensing humidity may be located external to the tape path. Note that if the humidity sensor is in the drive housing itself, a larger delay between readings is acceptable, as humidity changes in the drive may be relatively slow.

The first element 18 may be a single electrode. In one approach, the first element 18 may be alternately sensed and pulsed to bring the tape to the target voltage at very low to high frequency. Another implementation is to sense and adjust the current passing into the first element 18, as this may provide an adequate means of adjusting the charge state on the tape.

In yet another embodiment, the system can adapt to changing hydration requirements, on the fly, on a predetermined time interval, etc. Accordingly, the extent that the voltage of the medium is altered can vary with time, e.g., may be changed on the fly, on a predetermined time interval, etc. based on factors such as changes in ambient humidity, changes in measured media voltage level, etc.

In a preferred approach, a second element 20 is present. The second element 20 may or may not contact the tape 14 for allowing measuring of a voltage level of the tape 14. The second element preferably detects the medium voltage after it passes over the head.

The second element 20 may sense the tape voltage (potential difference between tape and ground). In one embodiment, this is preferably done by connecting the second element 20 to a high input impedance voltage sensing device, such as an electrometer, which preferably will not load the tape charging circuit. In another embodiment, the second element 20 may be connected to ground via a resistor. Then the voltage drop across the resistor is measured. The resistor is preferably large enough not to load the tribocharging circuit significantly.

The voltage level detected by the second element 20 may then be used, possibly in combination with other factors, such as media type or brand, to select the voltage adjustment performed using the first element 18. The tape voltage adjustment using the first element 18 may be updated frequently so that, about a constant voltage level is detected at the second element 20. Also note that for current tape heads, the voltage adjustment applied by the first element 18 is preferably below that which would result in a reading of greater than 5V at the second element 20.

The first and/or second elements 18, 20 may engage the tape 14. In this case, preferably, the first and/or second elements 18, 20 are formed of a wear resistant material such as a conductive ceramic, e.g., AlTiC. No particular shape is required for the first and/or second elements 18, 20. In a preferred approach, the first and/or second elements 18, 20 are flat lapped so that the tape contacts the elements in a manner similar to a flat tape head. The first and/or second elements 18, 20 may be located, for example, on either side of the head assembly. The functions of the electrical connections, when present, may reverse when the tape direction reverses.

In a preferred mode of use, the controller reads the voltage detected by the second element as well as the humidity level from a humidity sensor. The controller then selects a target tape voltage to obtain the desired reading at the second element. The selected voltage is set on the tape using the first element. The process may be periodically or continuously updated.

Accordingly, monitoring and adjusting the tape voltage controls both high humidity wear and low humidity shorting. The functions described above may also be incorporated directly into guides already in the drive, or into guide rollers, in which the roller axels may be isolated from ground and the roller shells may be contacted via carbon brushes or other commutator type contacts, as is well known. In addition the two elements may be combined into a single housing and the resulting assembly positioned either singly or in multiple locations in the tape path. Also, the basic concepts disclosed herein may be used in a disk drive by using the slider, or a dedicated slider as the means for both detecting disk voltage and applying a control voltage.

EXAMPLE 1

A first element is positioned in front of a tape head with respect to the direction of tape travel across the head. A second element is positioned on an opposite side of the tape head relative to the first element. The substrate of the head is biased at 1.5V.

Humidity is measured at about 55% relative humidity. The system determines that the tape voltage should initially be about 2V to achieve a tape hydration level that does not promote head corrosion but is not so low that parasitic accumulations are conductive. A voltage is applied by the first element at a level sufficient to provide a reading at the second element of about 2V. An illustrative voltage level applied at the first element may be about 3-7V.

EXAMPLE 2

A first element is positioned in front of a tape head with respect to the direction of tape travel across the head. A second element is positioned on an opposite side of the tape head relative to the first element. The substrate of the head is biased at 1.5V Humidity is measured at about 75% relative humidity. The system determines that the tape voltage should initially be about 2V to achieve a tape hydration level that does not promote head corrosion but is not so low that parasitic accumulations are conductive. A voltage is applied by the first element at a level sufficient to provide a reading at the second element of about 2V. An illustrative voltage level applied by the first element may be about 5-10V.

EXAMPLE 3

A first element is positioned in front of a tape head with respect to the direction of tape travel across the head. A second element is positioned on an opposite side of the tape head relative to the first element. The substrate of the head is biased at 1.5V.

Humidity is measured at about 40% relative humidity. The system determines that the tape voltage should be about 1.0 to 1.5V to match the head substrate voltage. A voltage is applied by the first element at a level sufficient to provide a reading at the second element of about 1.0-1.5V. An illustrative voltage level applied at the first element may be about 0-1.5V.

EXAMPLE 4

A first element is positioned in front of a tape head with respect to the direction of tape travel across the head. A second element is positioned on an opposite side of the tape head relative to the first element. The substrate of the head is biased at 1.5V.

Humidity is measured at about 10% relative humidity. The system determines that the tape voltage should be about 1.5V to match the substrate voltage. A voltage is applied by the first element at a level sufficient to provide a reading at the second element of about 1.5V. An illustrative voltage level applied at the first element may be about 0-2V.

EXAMPLE 5

A first element is positioned in front of a tape head with respect to the direction of tape travel across the head. A second element is positioned on an opposite side of the tape head relative to the first element. The substrate of the head is biased at 1.5V.

Humidity is measured at about 10% relative humidity. The system determines that no voltage should he applied to the tape.

The various embodiments described herein, or portions thereof, can be used separately or in combination with one another. The embodiments described herein may be used in combination with coated heads.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic storage system, comprising:
    a magnetic head adapted for at least one of reading from a medium and writing to the medium;
    a drive mechanism for directing the medium over the head; and
    a first element for selectively altering a voltage of the medium for altering a state of hydration of the medium.

2. The system as recited in claim 1, wherein the first element contacts portions of the medium prior to the portions of the medium passing over the head.

3. The system as recited in claim 1, further comprising a second element for allowing measuring of a voltage level of the medium.

4. The system as recited in claim 3, wherein the first element alters the hydration of portions of the medium prior to the portions of the medium passing over the head, wherein the second element encounters the portions of the medium after the portions of the medium pass over the head, wherein the voltage applied to the medium using the first element is based at least in part on the voltage of the medium measured using the second element.

5. The system as recited in claim 4, wherein an extent of the alteration of voltage of the medium using the first element is further based at least in part on an ambient humidity level.

6. The system as recited in claim 4, wherein an extent of the alteration of voltage of the medium using the first element is adjustable so that about a constant voltage level is detected at the second element.

7. The system as recited in claim 1, wherein an extent of the alteration of voltage of the medium using the first element is based at least in part on an ambient humidity level.

8. The system as recited in claim 7, wherein the voltage of the medium is adjusted to a first level using the first element if the ambient humidity level is above a first threshold amount, wherein the voltage of the medium is adjusted to a level lower than the first level using the first element if the ambient humidity level is below the first threshold amount.

9. The system as recited in claim 8, wherein the first voltage level is higher than a median voltage of a substrate of the head.

10. The system as recited in claim 8, wherein the second voltage level is about equal to a median voltage of a sensor of the head.

11. The system as recited in claim 8, wherein the second voltage level is about equal to a median voltage of a substrate of the head.

12. The system as recited in claim 8, wherein, if the ambient humidity level is below the first threshold amount and above a second threshold amount, the second voltage level is about equal to a median voltage of a sensor of the head; wherein, if the ambient humidity level is below the second threshold amount, the second voltage level is about equal to a median voltage of a substrate of the head.

13. The system as recited in claim 7, wherein the voltage of the medium is adjusted to a first level using the first element if the ambient humidity level is above a first threshold amount, wherein the voltage of the medium is not altered if the ambient humidity level is below the first threshold amount.

14. The system as recited in claim 7, further comprising a humidity sensor for measuring the ambient humidity level.

15. The system as recited in claim 1, wherein a voltage level of the medium is detected using the first element, wherein an extent that the voltage of the medium is altered using the first element is based at least in part on the voltage of the medium measured using the first element.

16. The system as recited in claim 15, wherein the extent that the voltage of the medium is altered using the first element is further based at least in part on an ambient humidity level.

17. The system as recited in claim 1, wherein an extent that the voltage of the medium is altered varies with time.

18. A magnetic storage system, comprising:
    a magnetic head adapted for at least one of reading from a medium and writing to the medium;
    a drive mechanism for directing the medium over the head; and a first element for selectively altering a voltage of the medium for altering a state of hydration of the medium, wherein the first element contacts portions of the medium prior to the portions of the medium passing over the head;

wherein the voltage applied to the medium using the first element is based at least in part on the voltage of the medium;

wherein the voltage applied to the medium using the first element is further based at least in part on an ambient humidity level.

19. The system as recited in claim 18, further comprising a second element for allowing measuring of a voltage level of the medium, wherein the second element contacts the portions of the medium after the portions of the medium pass over the head.

20. A tape drive system, comprising:

a magnetic head;

a drive mechanism for passing a magnetic tape over the head;

a controller in communication with the head; and a first element for applying a voltage to the tape for altering a state of hydration of the tape.

* * * * *